June 23, 1925.
M. EASTHAM
CONDENSER
Filed Oct. 11, 1923      3 Sheets-Sheet 1
1,542,995
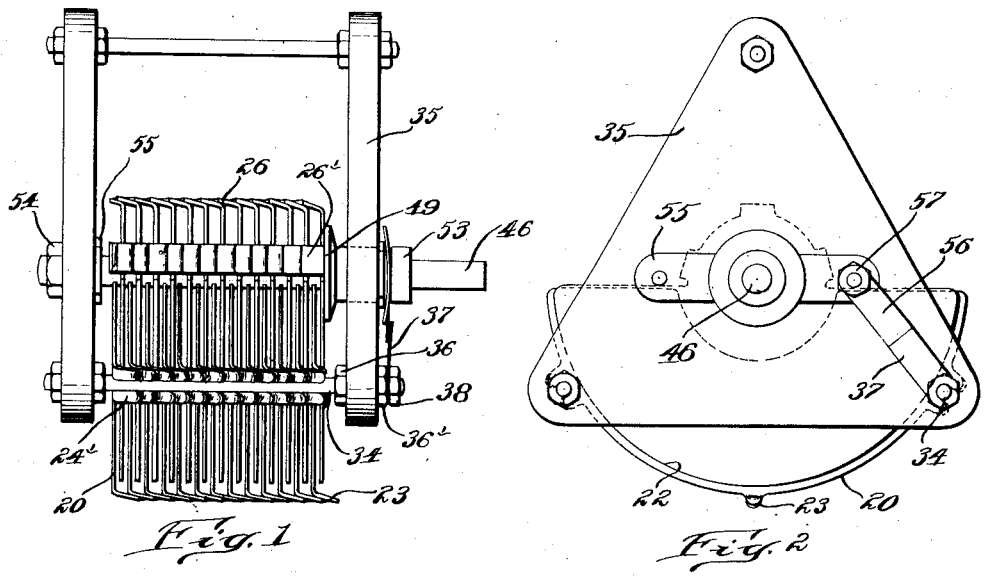
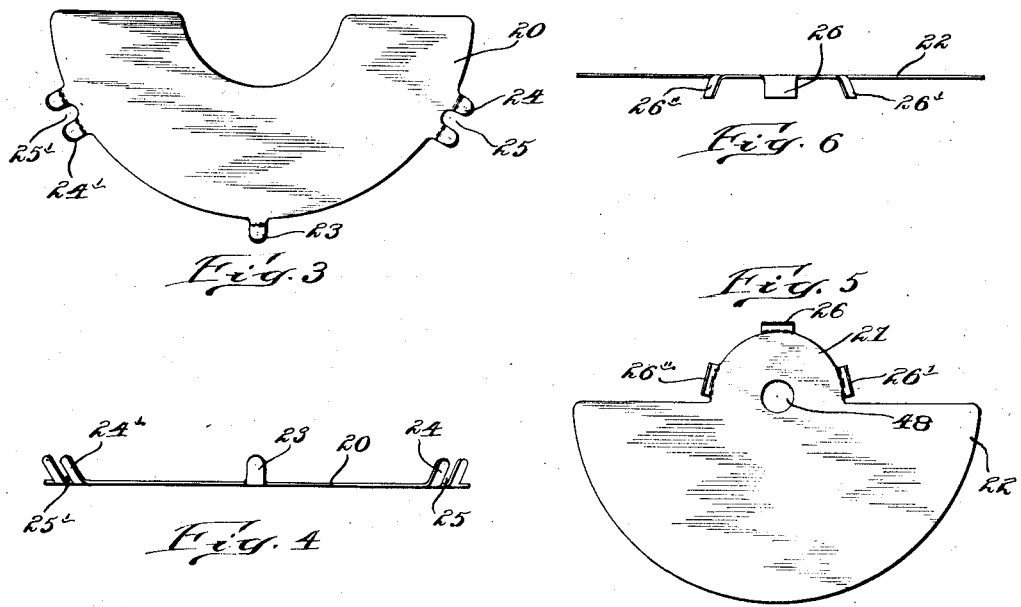
Inventor:
Melville Eastham
by Geo. K. Woodworth
atty.

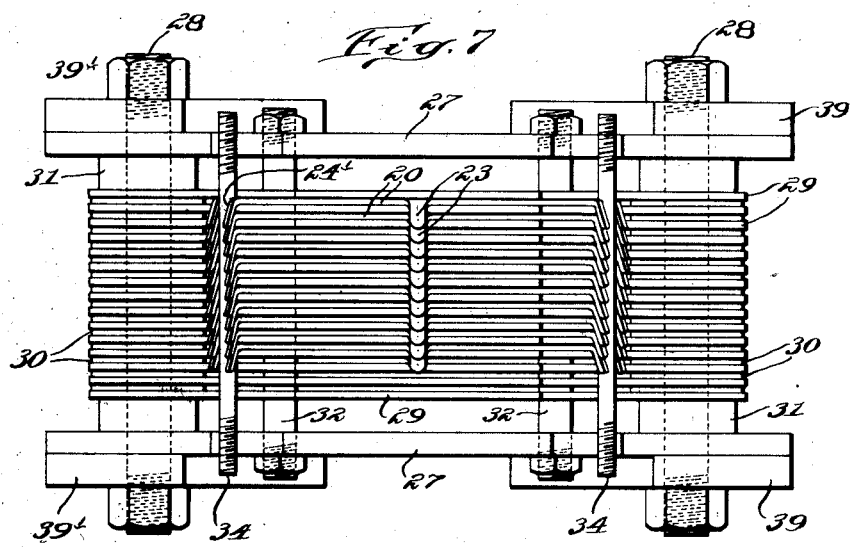
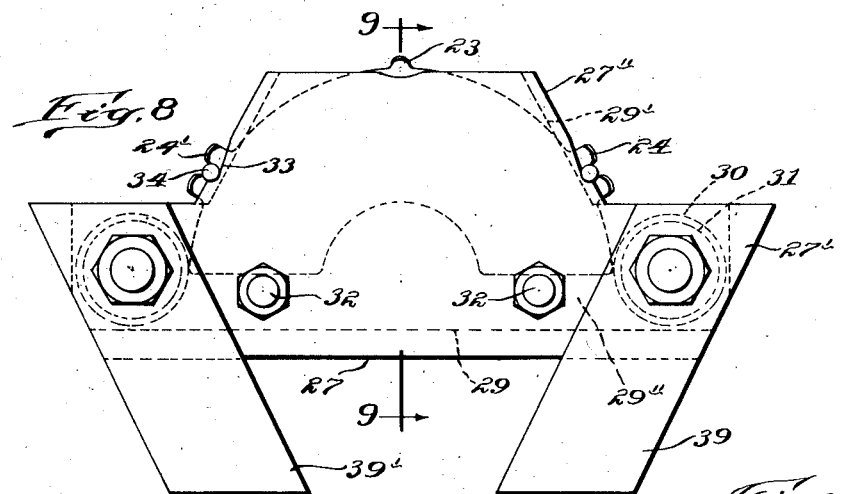
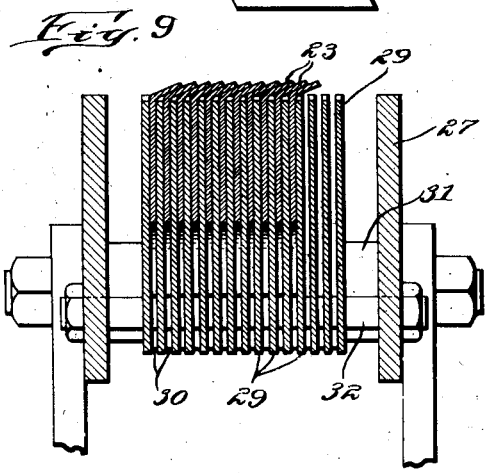
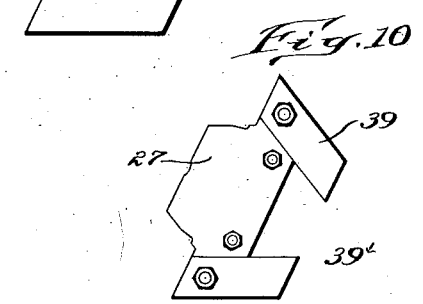

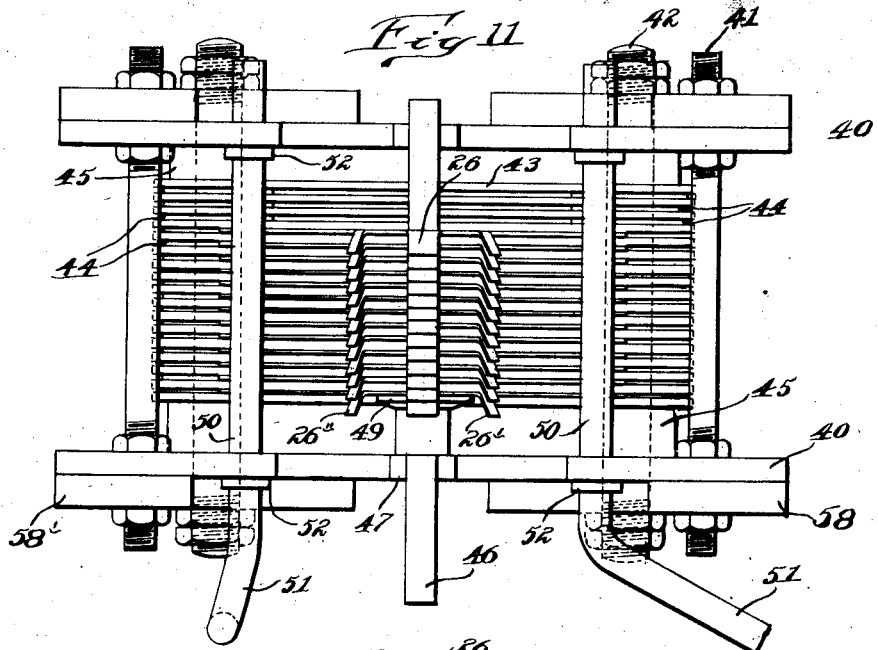
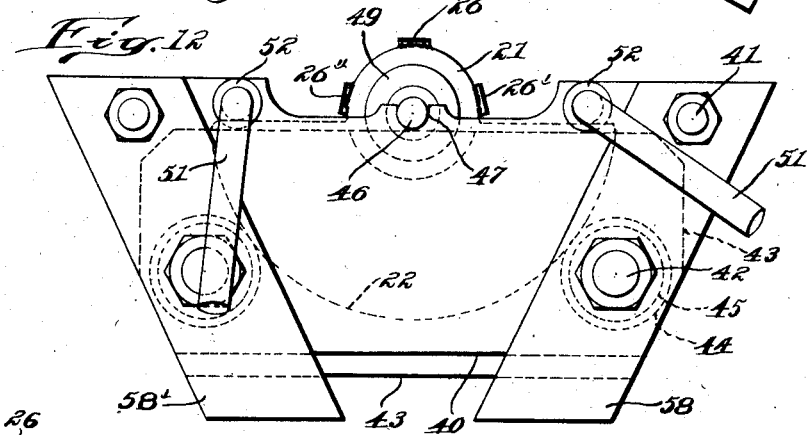
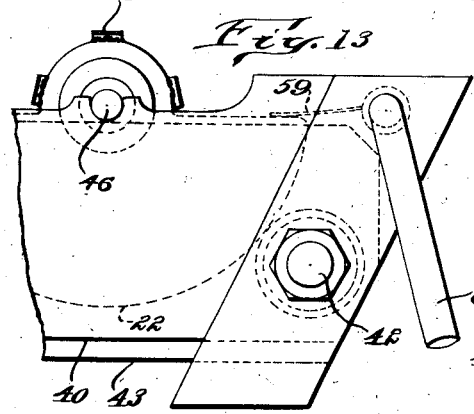
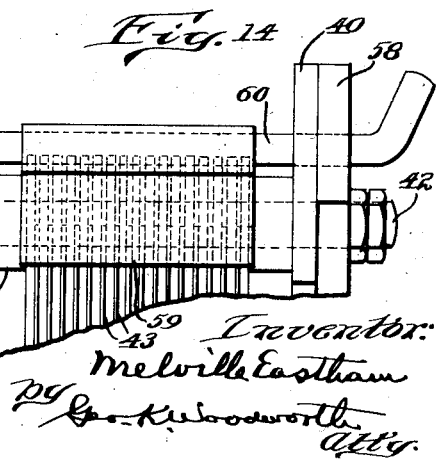

Patented June 23, 1925.

1,542,995

UNITED STATES PATENT OFFICE.

MELVILLE EASTHAM, OF CAMBRIDGE, MASSACHUSETTS, ASSIGNOR TO GENERAL RADIO COMPANY, OF CAMBRIDGE, MASSACHUSETTS, A CORPORATION OF MASSACHUSETTS.

CONDENSER.

Application filed October 11, 1923. Serial No. 667,867.

*To all whom it may concern:*

Be it known that I, MELVILLE EASTHAM, a citizen of the United States, and a resident of Cambridge, in the county of Middlesex and State of Massachusetts, have invented a new and useful Improvement in Condensers, of which the following is a specification.

My invention relates to electrical condensers and more especially to air condensers of the variable or adjustable type for use in radio and other high frequency work.

Heretofore in the manufacture of variable air condensers the plates of both the rotor and stator armatures are spaced apart by spacers permanently secured to the structures, the spacers separating the rotor plates being mounted on the shaft which supports the rotor armature, and those which separate the stator plates being mounted on rods passing through said plates near the peripheries thereof.

The cost of assembling such condensers is excessive because of the time involved, the weight of the apparatus is necessarily increased by the weight of the spacers, such condensers in general are not sufficiently accurate to permit of graduation in units of capacity, and they are subject to the further defect that the capacity thereof does not remain constant.

The principal objects of the present invention are to eliminate the foregoing limitations and defects by providing a condenser of the variable air type in which the plates of both the stator and rotor armatures are secured together electrically and mechanically, each to the plates of its set next adjacent thereto, to form unitary structures without spacers interposed between the several pairs of plates, to devise a method of so constructing variable air condensers and to produce jigs whereby said method conveniently may be realized in practice.

With these objects in view my invention comprises as its salient features condenser plates provided with lugs angularly related to the planes of said plates and arranged to partially overlap correspondingly positioned lugs on the plates next adjacent thereto, so that each lug may be secured to the lugs of the plates adjacent thereto, or to a metallic member located at right angles to the planes of the plates at or near the peripheries thereof, as for example, by soldering said plates together, or by soldering them to each other and to said metallic member.

My invention comprises further jigs for making the armatures of electrical condensers and embodying in their construction a plurality of plates, each separated from the other by spacers and having means for positioning the condenser plates therein, each between a pair of the jig plates, together with legs arranged at the proper angles to the horizontal so that the jig may be supported horizontally or in either of two inclined positions to facilitate the work of securing the condenser plates together.

My invention also comprises various features of construction and modes of procedure hereinafter set forth in the appended claims.

One embodiment of my invention which has given good results in practice, and also types of jigs whereby said condenser conveniently may be made, are shown in the drawings accompanying and forming a part of this specification in which,—

Figure 1 is a vertical elevation of a variable air condenser involving my invention;

Fig. 2 is an end view of said condenser;

Fig. 3 is a plan view of one of the stator plates;

Fig. 4 is an edge view of said stator plate;

Fig. 5 is a plan view of one of the rotor plates;

Fig. 6 is an edge view of said rotor plate;

Fig. 7 is a plan view of a jig for assembling the stator armature;

Fig. 8 is a vertical elevation of said jig;

Fig. 9 is a vertical section taken on the line 9—9 of Fig. 8;

Fig. 10 is a vertical elevation of a reduced scale of the jig shown in Fig. 8 illustrating the same in a position inclined to the horizontal;

Fig. 11 is a plan view of a jig for assembling the rotor armature;

Fig. 12 is a vertical elevation of the jig shown in Fig. 11;

Fig. 13 is a fragmentary vertical elevation of a modification of the jig shown in Fig. 12;

Fig. 14 is a fragmentary plan view of said modification.

In the particular drawings selected for more fully disclosing my invention, said drawings to be considered as illustrative of a particular form of the invention and not as restrictive, 20 represents one of the stationary plates making up the stator armature of the condenser, which as shown is semicircular with a section of its base cut away to accommodate the hub portion 21 of the rotor plate 22, and is provided with a peripheral lug 23 angularly related to the plane of the plate and arranged to partially overlap correspondingly-positioned lugs on the stator plate next adjacent thereto, as well as with two pairs of peripheral lugs 24, 24', similarly turned at an angle to the plane of the plate and arranged to partially overlap correspondingly-positioned lugs on the adjacent stator plate, the members of each pair of lugs being separated to form a slot 25, 25', the bottom or inner end of said slot being slightly wider than the open outer end thereof so that a pin may be retained therein.

The hub portions of the rotor plates are each provided with one or more lugs 26, 26', 26'', herein shown as three in number, and said lugs are each bent at an angle to the plane of the plate and arranged to partially overlap correspondingly-positioned lugs on the next adjacent rotor plate.

The armatures of the condenser are assembled by spacing the plates one from another, and when so spaced securing each plate mechanically and electrically to the adjacent plates by means of the aforesaid lugs so as to form unitary structures without spacers between each pair of plates. A convenient means for assembling the stator armature is shown in Fig. 7, and consists of a jig comprising two parallel plates 27 bolted together by the bolts 28 to form a frame, the said plates each having a lower trapezoidal portion 27' and a centrally arranged upper trapezoidal portion 27'', the longer bases of the two trapezoids being coincident. Arranged within the frame and parallel to the sides thereof are a plurality of plates 29 each spaced from its adjacent plates by the spacers 30 which are mounted on the bolts 28, collars 31 also mounted on said bolts serving to position the plates away from the sides of the frame.

The stator plates are inserted one by one in the spaces between the jig plates 29 as indicated in Figs. 7 and 8, the lugs 23 projecting about the shorter base of the trapezoidal portion 29' of the plates 29, which portion as shown in Fig. 8 is slightly within the trapezoidal portion 27'' of the jig frames, the lower portion 29'' of said plates being substantially rectangular.

When the stator plates are inserted in the jig, the lugs 24, 24' project beyond the inclined sides of the upper trapezoidal portion 29' of the jig plates, and their lower corners rest against the spacers 30, thereby preventing longitudinal movement of the condenser plates while the proper vertical position of the latter is obtained in the present instance by the bolts 32 extending transversely of the frames 27.

The inclined sides of the portion 27'' of the jig frames are provided with indentations 33 for receiving metallic members such as the pins 34 threaded on both ends which pass through the slots 25, 25' between the two pairs of peripheral lugs 24, 24' on the stator plates.

It will be understood of course that various other means may be employed to position the stator plates vertically and that metallic members of any suitable kind may be received in said slots 25, 25'.

After the stator plates have been positioned in the manner shown in Fig. 7 and the rods 34 inserted as above described, the said plates are each secured mechanically and electrically to the plates adjacent thereto and also to the metallic members 34 in any suitable manner, and in the present instance as indicated in Fig. 1 the lugs 23 are soldered together, and the several lugs 24, 24', respectively, are soldered together and also to their respective rods 34.

The finished stator armature is then lifted from the jig and secured in the frame 35 by the two rods 34 which pass therethrough and are held in position by the nuts 36, 36', a connection clip 37, if desired, being attached to one of said rods by the nut 38, although it will be understood of course that various other means may be adopted for connecting the stationary armature of the condenser in circuit.

The soldering operation is facilitated by providing the jig with legs 39, 39' attached to the ends of the frame and angularly related thereto so that the frame may be supported horizontally as shown in Fig. 8 for soldering or otherwise attaching the lugs 23, or in either of two inclined positions, one of which is indicated in Fig. 10, for the purpose of soldering or otherwise securing the other lugs and the metallic members passing therebetween.

In order to assemble the rotor armature, the rotor plates are spaced one from another and then while so spaced mounting them on a shaft, securing one of the end plates mechanically and electrically to said shaft and finally securing each plate mechanically and electrically to the plates adjacent thereto at the hub portions thereof, thereby forming a unitary structure without spacers between each pair of plates. A convenient means for assembling the rotor armature is shown in Fig. 11 and consists of a jig comprising two parallel plates 40 bolted together by the bolts 41, 42 to form a frame, said plates being trapezoidal in form and having arranged therebetween and parallel to the sides thereof a plurality of plates 43 each spaced from its adjacent plates by the spacers 44 which are mounted on the bolts 42, collars 45 serving to space the plates away from the sides of the frame.

The rotor plates 22 are inserted one by one in the spaces between the jig plates 43 as indicated in Figs. 11 and 12, the lugs 26, 26', 26'' projecting above the upper horizontal edge of said plates 43 and the proper vertical position of the plates being ensured by the washers 44 against which their peripheries rest.

After the plates have been placed in the jigs, the shaft 46 is inserted through the bearings 47 provided in the upper edge of the jig frame and through the holes 48 in the hub portions of the rotor plates until the flanged collar 49 which is rigidly secured to said shaft abuts the jig frame, in which position the farther end of said shaft will be above the farther plate 43 and will have passed through the hole in the rotor plate farthest away from said flanged collar.

Thereupon the shaft and rotor plates are slightly raised until said flanged collar clears the jig frame, whereupon said shaft is pushed forward until it occupies the position shown in Fig. 11 its flange abutting one of the end rotor plates and its farther end resting in the bearing in the farther plate 40 of the jig frame, a section of the end plate 43 being cut out to accommodate said flange.

The bases of the semicircular rotor plates must now be aligned before securing said plates together and one of several means for accomplishing this result is illustrated in Figs. 11 and 12, and consists of two rods 50, 50 with handles 51, 51 adapted to be inserted through the sockets 52, 52 in the jig frames and rest against the horizontal bases of the rotor plates, thereby accurately aligning the same.

After this has been done the flange of the flanged collar 49 is soldered or otherwise suitably attached to the hub portion of the rotor plate against which it abuts, and then the lugs 26, 26', 26'' are soldered together, each to the correspondingly-positioned lug next adjacent thereto, the rods 50, 50 withdrawn and the finished rotor lifted from the jig and placed in the frame 35 with its plates alternating with those of the stator armature, the proper relative position of the two armatures being maintained by the flanged collar 49, the collar 53 and nut 54, or any other suitable means.

Suitable bearings 55, 55 are provided for said shaft, and if desired a connection clip 56 may be attached to one of said bearings by the nut 57.

As in the case of the jig shown in Fig. 7 the soldering operation is facilitated by providing the jig with legs 58, 58' attached to the ends of the frame thereof, and angularly related thereto so that said frame may be supported horizontally as shown in Fig. 12 for soldering the lugs 26 together or in either of two inclined positions, one when the jig rests on the inclined edges of the legs 58 for soldering the lugs 26' and the other when it rests on the inclined portions of the legs 58 for soldering the legs 26''.

As indicated in Figs. 13 and 14 one of the rods 50 may be omitted and the rotor plates 22 aligned by the strip 59 of spring brass or other resilient material attached to the rod 60 which passes through the jig frame near one of the upper corners thereof, so that by turning the handle 61 of said rod to the right or in counterclockwise direction, the bases of the rotor plates against which said strip 59 rests will be aligned and held in alignment until the solder operation is completed by virtue of the tight fit of said rod 60 in its bearings.

A variable air condenser constructed according to my invention has the advantages that much less time is required for assembling the armatures thereof than in the case of the condensers of the prior art in which spacers form permanent parts of the structure, the weight of the armatures is reduced, the condensers are sufficiently accurate to permit of their use with scales graduated in micromicrofarads, and the structure of the rotor and stator is so substantial and rugged that in ordinary usage there is no opportunity for lateral variation in the spacing of the plates, and therefore the capacity thereof remains constant.

Having thus described an illustrative embodiment of my invention without however limiting myself thereto, what I claim and desire to secure by Letters Patent is:—

1. A stator plate for an electrical air condenser having peripheral lugs angularly related to the plane of said plate and arranged to partially overlap correspondingly-positioned lugs on one of the stator plates next adjacent thereto.

2. A stator plate for an electrical condenser having a pair of peripheral lugs angularly related to the plane of said plate and arranged to partially overlap correspondingly-positioned lugs on one of the stator plates next adjacent thereto, said lugs being separated to form a slot therebetween for receiving a pin.

3. A stator plate for an electrical condenser having a pair of peripheral lugs angularly related to the plane of said plate and arranged to partially overlap correspondingly-positioned lugs on one of the stator plates next adjacent thereto, said lugs being separated to form a slot therebetween for receiving a pin, the bottom or inner end of said slot being slightly wider than the open outer end thereof, whereby such pin may be retained therein.

4. A rotor plate for an electrical condenser having lugs on the periphery of its hub portion, said lugs being angularly related to the plane of said plate, and arranged to partially overlap correspondingly-positioned lugs on one of the rotor plates next adjacent thereto.

5. A stator armature for an electrical air condenser consisting of a set of stator plates and lugs on the peripheries of said stator plates, said lugs being angularly related to the planes of said plates and each lug being soldered to the lugs of the stator plates adjacent thereto.

6. A stator armature for an electrical condenser comprising a set of stator plates, lugs on the peripheries of said stator plates, said lugs being angularly related to the planes of said plates, and each arranged to partially overlap the correspondingly positioned lugs on one of the stator plates next adjacent thereto, and means securing each lug to the lugs of the stator plates adjacent thereto.

7. A stator armature for an electrical condenser comprising a set of stator plates, said stator plates having pairs of peripheral lugs angularly related to the planes of said plates, and each arranged to partially overlap the correspondingly positioned lugs on one of the stator plates next adjacent thereto, the members of each pair of lugs being separated to form a slot, a pin located in said slot and means securing said lugs to said pin.

8. A rotor armature for an electrical condenser comprising a set of rotor plates, lugs on the peripheries of the hub portions of said rotor plates, said lugs being angularly related to the planes of said plates, and means securing each lug to the lugs of the rotor plates adjacent thereto.

9. A rotor armature for an electrical condenser comprising a set of rotor plates, lugs on the peripheries of the hub portions of said rotor plates, said lugs being angularly related to the planes of said plates, and each arranged to partially overlap the correspondingly positioned lugs on one of the rotor plates next adjacent thereto, and means securing each lug to the lugs of the rotor plates adjacent thereto.

10. An electrical condenser having a set of rotor plates and a set of stator plates, lugs on the peripheries of the hub portions of said rotor plates, means securing each lug to the lugs of the rotor plates adjacent thereto, lugs on the peripheries of said stator plates, and means securing each lug to the lugs of the stator plates adjacent thereto.

11. An electrical condenser having a set of rotor plates and a set of stator plates, lugs on the peripheries of the hub portions of said rotor plates, said lugs being angularly related to the planes of said plates and each arranged to partially overlap the correspondingly-positioned lugs on one of the rotor plates adjacent thereto, means securing each lug to the lugs of the rotor plates adjacent thereto, lugs on the peripheries of said stator plates, said lugs being angularly related to the planes of said plates and each arranged to partially overlap the correspondingly-positioned lugs on one of the stator plates next adjacent thereto, and means securing each lug to the lugs of the stator plates adjacent thereto.

12. An electrical condenser having a set of rotor plates and a set of stator plates, lugs on the peripheries of the hub portions of said rotor plates, said lugs being angularly related to the planes of said plates and each arranged to partially overlap the correspondingly-positioned lugs on one of the rotor plates next adjacent thereto, means securing each lug to the lugs of the rotor plates adjacent thereto, said stator plates having pairs of peripheral lugs angularly related to the planes of said plates and each arranged to partially overlap the correspondingly positioned lugs on one of the stator plates next adjacent thereto, the members of each pair of lugs being separated to form a slot, a pin located in said slot and means securing said lugs to said pin.

13. A jig for making the armatures of electrical condensers comprising a frame, a plurality of plates held in said frame, spacers between each pair of plates, and means for positioning condenser plates in said jig, each between a pair of the first mentioned plates.

14. A jig for making the armatures of electrical condensers comprising a frame, a plurality of plates held in said frame, spacers between each pair of plates, means for positioning condenser plates in said jig, each between a pair of the first mentioned plates, and legs attached to the ends of said frame and angularly related thereto whereby said frame may be supported horizontally or in either of two inclined positions.

15. A jig for making the stator armature of an electrical condenser comprising a frame, a plurality of plates held in said frame, spacers between each pair of plates and horizontal rods passing through said frame for supporting the bases of semicircular stator plates, each between a pair of the first mentioned plates.

16. A jig for making the rotor armature of an electrical condenser comprising a frame, a plurality of plates held in said frame, and spacers between each pair of plates, said spacers being arranged to support the peripheries of semicircular rotor plates, each between a pair of the first mentioned plates.

17. A jig for making the rotor armature of an electrical condenser comprising a frame, a plurality of plates held in said frame, spacers between each pair of plates, said spacers being arranged to support the peripheries of semicircular rotor plates, each between a pair of the first mentioned plates, and means extending transversely of said jig and bearing on the horizontal bases of said rotor plates for positioning the same.

In testimony whereof, I have hereunto subscribed my name this 10th day of October, 1923.

MELVILLE EASTHAM.